Patented May 24, 1932

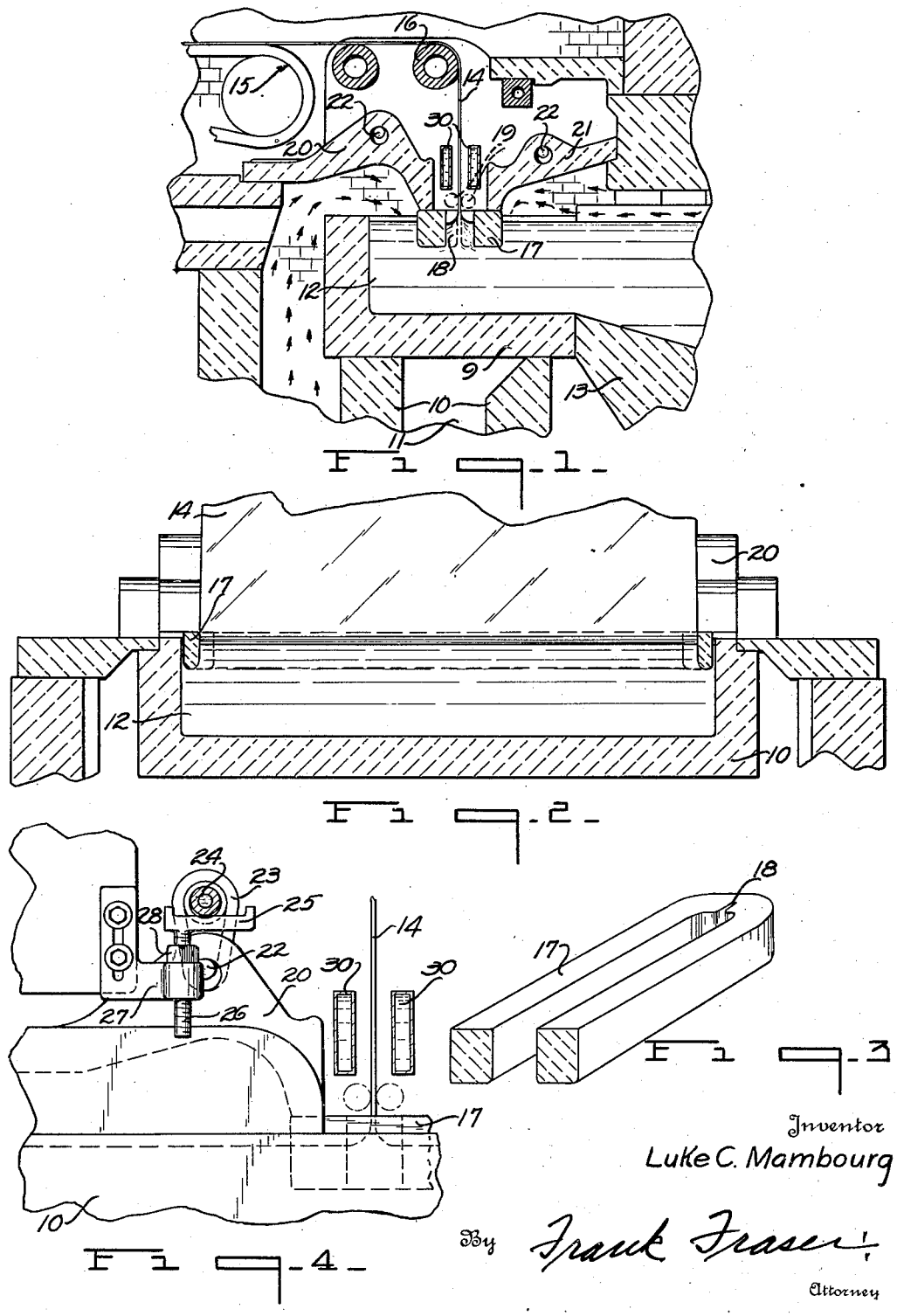

1,860,044

UNITED STATES PATENT OFFICE

LUKE C. MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS APPARATUS

Application filed May 8, 1928. Serial No. 276,057.

This invention relates broadly to the manufacture of glassware and more especially to the production of sheet glass in flat sheet form.

An important object of the present invention is the provision of apparatus designed primarily for the drawing of glass upwardly in sheet form from a bath of molten glass and more particularly to improvements therein tending to render more efficient, expedite or otherwise facilitate the formation of the sheet.

Another object of the invention is to provide in sheet glass apparatus, means arranged above the bath of molten glass from which the sheet is drawn for protecting the same from disturbing atmospheric changes and for maintaining the same relatively free from dirt, dust or other foreign matter.

Another object is the provision of means for protecting the sheet being drawn from the heated gases in and around the working receptacle or draw pot and for preventing such gases from striking against the sheet during its formative period causing hot and cold streaks therein and disturbing the thickness thereof.

A further object is to provide sheet glass forming apparatus of the above character wherein a source or relatively small pool of molten glass is segregated or separated from the molten bath, the sheet being drawn from this segregated source or pool, and means being provided whereby said source is continuously replenished with sub-surface glass from said bath whereby to improve the quality of the sheet produced.

Other objects and advantages of the invention will become more apparent during the course of the following description when taken in connection with the accompanying drawings.

In the drawings forming a part of this application and wherein like numerals are employed to designate like parts throughout the same, Fig. 1 is a longitudinal vertical section through one type of apparatus constructed in accordance with the present invention.

Fig. 2 is a transverse vertical section therethrough.

Fig. 3 is a perspective section of the drawing member or float, and

Fig. 4 is an end view showing the adjustment for the lip tiles.

Referring now to the drawings, there is provided a working receptacle or draw pot 9 herein shown as being supported upon stools 10 above a suitable heating chamber 11. The working receptacle 9 is adapted to contain a mass or bath of molten glass 12 supplied thereto continuously or substantially continuously as desired from a suitable furnace 13 which may or may not be of the continuous tank type as preferred. A sheet 14 is adapted to be drawn upwardly from the mass of molten glass 12 in receptacle 9 by the action of suitable drawing mechanism shown diagrammatically at 15, the said sheet being drawn initially in a generally vertical direction and subsequently deflected into the horizontal plane about a bending member or roll 16.

In accordance with the present invention there is disposed or immersed within the mass of molten glass 12 a float or drawing member 17, said member being preferably of a slotted or elongated ring construction as shown in Fig. 3 and provided at its opposite ends with the vertically extending relatively narrow slots 18. Since the drawing member 17 is of a slotted or ring construction, when the same is immersed within the mass of molten glass as shown in Fig. 1, the same will function to segregate or separate from the mass of glass 12 a relatively small pool 18 which forms the source from which the sheet 14 is drawn.

The float is arranged transversely of the draw pot 9 so that the width of the sheet extends longitudinally thereof. The edges of the sheet are adapted to be drawn upwardly through the relatively narrow slots 18, the walls of which serve to create a resistance to the movement of the glass therethrough and thereby function to maintain the sheet to a desired subsantially constant width. Also, if desired, additional width maintaining means in the form of knurled rollers or the like 19 may be utilized, said members engaging the edges of the sheet as it leaves the float 17. Heat absorbing members or coolers 30 are also preferably arranged at opposite sides of the sheet above the knurled rollers 19 to assist in conditioning the same.

Heretofore, in this type of apparatus, it has been customary to expose a considerable portion of the surface of the molten glass from which the sheet is drawn to the atmosphere but it has been found in actual practice that conditions can be disturbed and difficulty had with the production of high quality sheet by the mere opening or closing of a door or window in the building in which the machine is located. Also, in the past, the sheet has ordinarily been exposed during its formative period to the heated gases in and around the draw pot and the gases issuing from the furnace and pot chamber 11, said gases passing beneath the lip tiles and striking against the sheet.

It is an aim of the present invention to avoid the above objectionable features in furnaces of this type and to accomplish this, there is arranged at opposite sides of the sheet 14 above pot 12 the cover or lip tiles 20 and 21, the forward ends of which are adapted to rest upon opposite sides of the float or drawing member 17 as shown particularly in Fig. 1. These lip tiles serve to protect the surface of the molten glass from dust, dirt and other foreign matter and to also protect the molten glass from disturbing atmospheric changes since any draft is prevented from going under the lip tiles to the glass within the pot and on through into the furnace. Moreover, the heated gases which escape from the furnace and pot chamber are prevented from passing beneath the lip tiles and coming into contact with the sheet during its formative period. Instead, the gases are directed downwardly from the molten glass and thereby serve to heat the glass and maintain the same at opposite sides of the drawing member in a heated condition thus preventing the devitrification thereof and the formation of dog-metal which should be avoided.

Each lip tile 20 is pivotally mounted upon a shaft 22 extending entirely therethrough and the opposite ends of this shaft are hung within links 23 carried by supporting member 24, said supporting member being in turn carried by brackets 25 having depending portions 26 threaded through brackets 27 secured to the wall of the furnace and being adjustable by nuts or the like 28. Thus, upon lowering of the forward ends of the lip tiles, the float 17 can be forced downwardly into the molten glass to the desired depth. By immersing the float within the molten glass in the manner described, it is possible to obtain a sub-surface draw which is believed to be desirable. In other words, the sheet is largely drawn from sub-surface glass instead of from the surface of the mass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim—

1. In sheet glass apparatus, a receptacle adapted to contain a mass of molten glass, slotted means immersed within the mass of molten glass for segregating a relatively small pool of glass therefrom from which the sheet is adapted to be vertically drawn, substantially horizontal lip tiles arranged at opposite sides of the sheet above the mass of molten glass with the forward ends thereof resting upon said slotted means, and means for adjusting the lip tiles to force the slotted means downwardly into the mass of molten glass to the desired depth, said lip tiles being disposed over and covering the molten glass within the receptacle at opposite sides of said slotted means.

2. In sheet glass apparatus, a receptacle adapted to contain a mass of molten glass, a slotted member immersed within the mass of molten glass for segregating a relatively small pool of glass therefrom from which the sheet is adapted to be vertically drawn, substantially horizontal lip tiles arranged at opposite sides of the sheet above the mass of molten glass with the forward ends thereof resting upon said slotted member, and means for adjusting the lip tiles to force the slotted member downwardly into the mass of molten glass to the desired depth, said lip tiles being disposed over and covering the molten glass within the receptacle at opposite sides of said slotted member.

3. In sheet glass apparatus, a receptacle adapted to contain a mass of molten glass, an elongated ring member immersed within the mass of molten glass for segregating a relatively small pool of glass therefrom from which the sheet is adapted to be vertically drawn, said member being provided with vertically extending restricted slots at its opposite ends through which the edges of the sheet pass, substantially horizontal lip tiles arranged at opposite sides of the sheet above the mass of molten glass with the forward ends thereof resting upon said ring member, and means for adjusting the lip tiles to force said ring member downwardly into the molten glass to the desired depth, said lip tiles being disposed over and covering the molten glass within the receptacle at opposite sides of said ring member.

Signed at Lancaster, in the county of Fairfield and State of Ohio, this 4th day of May, 1928.

LUKE C. MAMBOURG.